United States Patent [19]

Arens

[11] 4,299,880

[45] Nov. 10, 1981

[54] DEMAND AND TIMED RENEWING IMAGING MEDIA

[75] Inventor: Robert P. Arens, North St. Paul, Minn.

[73] Assignee: Minnesota Mining and Manufacturing Company, Saint Paul, Minn.

[21] Appl. No.: 94,645

[22] Filed: Nov. 15, 1979

[51] Int. Cl.[3] ........................ B41M 5/00; G01D 15/34

[52] U.S. Cl. .................................. 428/304; 346/135.1; 427/146; 428/307; 428/331

[58] Field of Search ...................... 346/135.1; 427/146; 428/199, 206, 207, 211, 306, 307, 530, 537, 331, 304

[56] References Cited

U.S. PATENT DOCUMENTS

| | | | |
|---|---|---|---|
| 775,747 | 11/1904 | Doberenz | 101/33 |
| 866,293 | 9/1907 | Meyer | 41/20 |
| 2,299,991 | 10/1942 | Kallock | 234/74 |
| 2,854,350 | 9/1958 | Philpotts | 428/499 |
| 3,031,328 | 4/1962 | Larsen | 117/36.7 |
| 3,247,006 | 4/1966 | Hoge et al. | 428/920 |
| 3,508,344 | 4/1970 | Thomas | 35/9 |
| 3,684,551 | 8/1972 | Seiner | 427/152 |
| 4,064,304 | 12/1977 | Fujita | 428/207 |

OTHER PUBLICATIONS

Clancy, "Microvoid Coatings in Graphic Arts Applications, A Patent Survey," *Ind. Eng. Chem. Prod. Res. Develop.*, vol. 13, #1, pp. 30–34, 1974.

Seiner, "Microvoids as Pigments, A Review," *Ind. Eng. Chem. Prod. Res. Dev.*, vol. 17, #4, pp. 302–317, 1978.

*Primary Examiner*—Bruce H. Hess

*Attorney, Agent, or Firm*—Cruzan Alexander; Donald M. Sell; Richard E. Brink

[57] ABSTRACT

Microvoid-containing sheet material of the type which displays visible indicia when a liquid applied to the surface fills the microvoids. The improvement lies in making the liquid-receiving surface from particles held in pseudo-sintered juxtaposition by a thermoset binder, thereby rendering the structure resistant to inadvertent marking when it is subjected to heat, pressure, or both.

5 Claims, No Drawings

DEMAND AND TIMED RENEWING IMAGING MEDIA

BACKGROUND OF THE INVENTION

This invention relates to sheet material, especially a base sheet obscured by an opaque but transparentizable microporous, diffusely light-reflective layer.

For centuries paper has been one of the most versatile substances made by man. Formed from commonly available cellulosic materials, it can be made stiff or flexible, rough or smooth, thick or thin, and provided with any desired color. After it has served its intended purpose, it can often be repulped and used again. In recent years, however, the demands for paper have increased to the extent that it has finally been recognized that the sources of cellulosic raw materials are not inexhaustible. Further, the energy required to manufacture paper is a significant consideration in a world becoming increasingly aware that supplies of energy are also finite. It has also become recognized that, where paper is used as a carrier for indicia, it can generally be used only once, it being impossible or impractical to remove indicia which are no longer needed or desired. There has thus arisen a desire for a substitute for paper, especially one which can be repeatedly and easily reused; even a substitute which was more expensive to manufacture would be less expensive in the long run if it could be reused a sufficient number of times.

Several U.S. patents (e.g., U.S. Pat. Nos. 2,299,991, 3,031,328 and 3,508,344) disclose composite sheet material wherein a light-colored opaque blushed lacquer layer is coated over a base sheet which is either dark-colored or imprinted with dark-colored indicia. The opacity and light color of the blushed lacquer coating are due to the inclusion of numerous microvoids; the local application of (1) heat or pressure (either of which irreversibly collapses the microvoids) or (2) a non-solvent liquid having substantially the same refractive index as the lacquer (which fills the microvoid), causes the coating to become selectively transparent and the underlying dark backing to become visible. A liquid employed to impart transparency to the opaque microporous layer can subsequently be volatilized to restore the original appearance. If, however, an attempt is made to volatilize the liquid quickly by subjecting the sheet to temperatures as high as 150 C., many of the microvoids in the lacquer are collapsed, causing undesirable irreversible transparentizing.

U.S. Pat. No. 2,854,350 describes structures which are functionally similar to those just described, except that the blushed lacquer coatings are replaced by a microporous layer of finely divided calcium carbonate in an organic binder. Transparency is imparted by locally applying pressure or treating selected areas with a wax, oil or grease having a refractive index similar to that of the calcium carbonate. Other pigments may be incorporated in a microporous highly plasticized resin binder; see U.S. Pat. No. 3,247,006. If the binder is not thermosoftening, sheets of this type may be able to resist transparentization when heated, but the microporous layer is still irreversibly transparentized when subjected to localized pressure of a fingernail or paper clip, creasing, etc. Indeed, prior to the present invention, it is believed that no one recognized the potential advantages of a sheet material which could be repeatedly reversibly imaged by applying a selected transparentizing liquid but could not be imaged by normal heat or the pressure which results from handling, or particularly from use of a ball point pen, etc. It is similarly believed that no one had either intentionally or inadvertently devised such a product.

BRIEF DESCRIPTION

The present invention provides a repeatedly reusable sheet material of the type comprising a self-supporting base sheet (which may be transparent, colored, or provided with desired indicia), on at least one surface of which is coated an opaque microporous layer comprising particles having a refractive index in the range of about 1.3 to 2.2, preferably about 1.4–1.8. The particles are incorporated in a binder which has a refractive index in the same range as the particles (preferably about the same as that of the particles), interconnected microvoids being present throughout the layer and being open to the exposed surface of the sheet material. As in previous constructions of this general type, when liquid having (1) a refractive index approximating that of the particles and binder and (2) interfacial tension with respect to the porous coating less than that between the coating and its surrounding gaseous environment, is applied to the surface of the layer, the liquid penetrates the microvoids in the layer, thereby reducing its reflectivity in the immediate vicinity of such penetration, imparting transparency and visually exposing the underlying surface of the base.

In accordance with the invention, the cohesion of the microporous layer (including the adhesion of the binder to the particles) is at least 200 grams-force (preferably at least 300 grams-force) as measured by a test which determines the loading weight required to cause a moving sapphire stylus to cut through a 50-micrometer layer. As a result of this high cohesion, the microporous layer successfully resists the localized application of pressure, which would collapse the microvoids and cause permanent transparentization of either blushed lacquer coatings or previously known particle-filled coatings of the type described. The sheet material of the invention is thus capable of withstanding rough handling, bending, flexing, etc. without thereby acquiring permanent marks. The sheet material thus lends itself to repeated use in student workbooks, recording charts, order forms read by optical character recognition devices, etc.

In order to ensure the presence of microvoids in the layer, the binder:particle volume ratio is selected so that the particles are held in pseudo-sintered juxtaposition; this effect is obtained by employing a binder:particle volume ratio in the range of about 1:20 to 2:3, preferably 1:5–1:2. Speaking in general terms, a relatively low binder:particle volume ratio is employed when most of the particles are of relatively large size; correspondingly, a relatively high binder:volume ratio is employed when most of the particles are of relatively small size. The diameter of the particles is in the range of 0.01 to 750 micrometers, preferably 1–10 micrometers. Particles are preferably of calcium carbonate because of its low cost and relatively mild abrasiveness. Siliceous particles, especially those free from internal voids, may also be used.

The void volume of the microporous layer can be calculated by calipering its average thickness, calculating the apparent volume of a given area, weighing, filling the micropores by coating with a liquid of known density, wiping off the excess and reweighing; the volume of liquid absorbed into the microvoids can then be calculated, as can the percent of the apparent volume occupied by liquid. The void volume should be in the range of about 15–70%, preferably 35–50%.

Since the volume of particles exceeds the volume of binder in any structure contemplated by the invention, the refractive index of the particles is of primary importance in determining the refractive index of the coating and the refractive index of the binder is of secondary importance. Accordingly, for maximum image contrast, the refractive index of any marking liquid selected should at least approximately correspond to the refractive index of the binder and be substantially the same as that of the particles, to enhance the effect of the marking liquid. Upon the application of a liquid to the surface of the microporous layer, the degree of transparentization is directly related to how closely the refractive indexes of the coated layer and the applied liquid correspond. Thus, when a dark-colored base is employed, it is possible to create images which vary in intensity by employing marking liquids having a spectrum of refractive indexes which range from closely approximating that of the coated layer to quite different therefrom.

The intensity of image which results from the use of any marking liquid is conveniently determined by measuring the diffuse reflectance of an unimaged sheet, completely impregnating the microvoid-containing layer with the liquid, and remeasuring the diffuse reflectance; the greater the difference in the two values, the greater the image intensity will be. One useful instrument for measuring reflectance is made by Hunter Associates Laboratories, Inc.

After a marking liquid is applied to the coated surface, the persistence of the resultant image or indicia will be approximately inversely related to the vapor pressure of the liquid. In other words, an extremely volatile liquid will impart indicia which disappear quickly, while a high-boiling liquid will impart indicia which remain for an extended period. Image persistence for indicia imparted by a given marking liquid is approximately halved for every 10° C. temperature rise.

As previously pointed out, the unique advantage offered by the product of the present invention resides in the ability of the microporous layer to become transparent in the presence of a pore-impregnating liquid especially an innocuous, chemically unreactive liquid, while simultaneously resisting any tendency to become transparent when subjected to localized pressure and/or heat. In order to determine whether a composition would be suitable for use as a layer in accordance with the invention, several empirical tests have been developed, as will now be described. In each case a dispersion of the putative composition is knife-coated on a cleaned gray cold-rolled steel panel, dried and cured as appropriate for the composition to provide a coating 50 to 60 micrometers thick.

Image force test

A sheet of bond paper 100 micrometers thick is placed over the cured coating. A ballpoint pen (1000-micrometer diameter ball) is then drawn along the paper under various loadings, 100 to 500 grams perpendicular force having been found to approximate that experienced in normal handwriting. The force required to cause localized transparentization of the coating is noted. This force should exceed 300 grams if the product is to resist normal handling.

Cohesion test

This test is performed using the "Balance Beam Scrape-Adhesion and Mar Tester" sold by Gardner Laboratory, Inc., Bethesda, Md. The apparatus consists of a pivoted beam, on one end of which are mounted a movable 45° stylus holder, a weight post, and a holder for supporting the test load. A cam raises and lowers a sapphire-tip stylus into contact with the coated test panel, and a platform, riding on ball bearings, moves the panel (previously conditioned for 24 hours at 22° C. and 35% relative humidity) away from the stationary stylus. The minimum grams-force required to form a 50-micrometer deep scratch in the coating in a single pass is determined at a magnification of 40×. This force is reported as cohesive value; it has been found empirically that the cohesive value, measured to the nearest 50 grams-force, should be at least 200 grams-force (preferably at least 300 grams-force) to avoid inadvertent and irreversible marking caused by fingernails, paper clips, creasing, pens, etc.

As an aid to understanding the invention, attention is directed to the following illustrative but non-limiting examples, in which all parts are by weight unless otherwise noted.

DESCRIPTION OF PRESENTLY PREFERRED EMBODIMENTS

EXAMPLE 1

25 parts of a 57:22:22 xylene:ethylene glycol monoethyl ether acetate:methyl isobutyl ketone solvent blend and 8 parts of commercial 60% 66:34 xylene:2-ethoxy ethylacetate solution of a thermosetting acrylic resin (commercially available from Henkel Corporation under the trade designation "G-Cure 868-RX-60") and 0.2 part of di(dioctylpyrophosphato)ethylene titanate (commercially available from Kenrich Petrochemicals, Inc. under the trade designation "KR-238S") were mixed to form a uniform solution. Next there was added 100 parts of angular (pseudo-cubic) calcium carbonate having a particle size distribution of 1 to 15 micrometers, (available from Sylacauga Calcium Products under the trade designation "Dryca-Flo 125"). The resulting dispersion was homogenized at 280 kg/cm$^2$ and allowed to cool to room temperature, after which there was added 2.49 parts of a 75% 75:25 xylene:2-ethoxy ethylacetate solution of a high molecular weight biuret of 1,6-hexamethylene diisocyanate, commercially available from Mobay Chemical Co. under the trade designation "Desmodur" N-75. The dispersion was then coated onto one side of a 58-micrometer black greaseproof paper, using a 50-micrometer knife orifice, and the coating dried for 3 minutes at 110° C. to leave a 25-micrometer coating. After curing 1½ hours at 130° C., the coated paper had a uniformly white appearance, but the localized application of toluene caused transparentization, permitting the black color of the backing to be visible, contrasting sharply with the white color of the adjacent areas. The coating was subjected to the localized pressure of a heated stylus, however, without causing transparentization.

The tabulated examples below further indicate the nature of the invention, data from Example 1 being included for the convenience of the reader:

ABBREVIATIONS USED IN TABULATED EXAMPLES

Color:

B=black

Br=brown
T=translucent

Backing:
aca=acrylic-coated aluminum
gln=glassine
gpp=greaseproof paper
PET=biaxially oriented polyethylene terephthalate Particle Shape:
ang=angular
fib=fibrous
sph=spherical Particle Composition:
$Al_2O_3$=aluminum oxide (corundum)
gl=glass
HAO=hydrated aluminum oxide, $Al_2O_3.3H_2O$
si=silica
tsi=silane-treated silica
$CaCO_3$=calcium carbonate
cst=corn starch
$TiO_2$=titanium dioxide
ZnO=zinc oxide Binder:
AC=acrylic
EP=epoxy
PU=polyurethane
TSA=thermoset alkyd Marking Liquid:
tol=toluene
BA=n-butyl acetate
DEP=diethylphthalate
DIM=diiodomethane
DOP=dioctylphthalate
FAT=perfluorinated aliphatic tertiary amine
DBP=dibutylphthalate
GTA=glycerol triacetate
$H_2O$=water
PASI=piperidine, $AsI_3$, $SbI_3$ solution

TABLE I

| | EXAMPLE NO. | 1 | 2 | 3 | 4 | 5 | 6 | 7 |
|---|---|---|---|---|---|---|---|---|
| Backing | Material | gpp | aca | PET | gpp | gln | PET | PET |
| | Thickness, micrometers | 58 | 100 | 50 | 38 | 28 | 50 | 50 |
| | Color | B | B | B | Br | T | B | B |
| Cured coating | Thickness, micrometers | 25 | 1650 | 1000 | 25 | 25 | 38 | 20 |
| | Void volume, % | 28 | 61 | 50 | 38 | 29 | 44 | 38 |
| Binder | Composition | AC | TSA | TSA | TSA | TSA | TSA | TSA |
| | Refractive index | 1.5 | 1.5 | 1.5 | 1.5 | 1.5 | 1.5 | 1.5 |
| | Weight % | 9 | 12 | 2.7 | 14 | 14 | 9.7 | 18.4 |
| | Volume % | 18 | 24 | 5.7 | 27 | 27 | 17.8 | 30.6 |
| Particle | Composition | $CaCO_3$ | gl | si | tsi | tsi | HAO | si |
| | Shape | ang | fib | ang | ang | ang | ang | sph |
| | Size, micrometers | 0.5–15 | 50 × 1500 | 300–500 | 1–5 | 1–5 | 0.2–2 | 1–7 |
| | Refractive index | 1.6 | 1.5 | 1.5 | 1.6 | 1.6 | 1.6 | 1.5 |
| | Hardness, Knoop | 135 | 560 | 820 | 820 | 820 | 120 | 560 |
| | Weight % | 91 | 88 | 97.3 | 86 | 86 | 90.3 | 81.6 |
| | Volume % | 82 | 76 | 94.3 | 73 | 73 | 82.2 | 69.4 |
| | Binder:particle volume ratio | 0.22 | 0.32 | 0.06 | 0.36 | 0.36 | 0.22 | 0.44 |

| | EXAMPLE NO. | 8 | 9 | 10 | 11 | 12 | 13 | 14 |
|---|---|---|---|---|---|---|---|---|
| Backing | Material | PET | PET | PET | gpp | PET | PET | PET |
| | Thickness, micrometers | 50 | 50 | 63 | 38 | 46 | 50 | 50 |
| | Color | B | B | B | Br | B | B | B |
| Cured Coating | Thickness, micrometers | 25 | 38 | 15 | 216 | 38 | 20 | 28 |
| | Void volume | 36 | 15 | 32 | 65 | 33 | 36 | 37 |
| Binder | Composition | PU | TSA | EP | TSA | TSA | TSA | TSA |
| | Refractive index | 1.6 | 1.5 | 1.6 | 1.5 | 1.5 | 1.5 | 1.5 |
| | Weight % | 17.4 | 9.4 | 23 | 2.6 | 7.6 | 9.4 | 9.1 |
| | Volume % | 31.8 | 17.9 | 40 | 7.6 | 8.8 | 15.7 | 31.4 |
| Particle | Composition | si | si | si | $Al_2O_3$ | cst | $TiO_2$ | ZnO |
| | Shape | ang | sph | ang | ang | sph | ang | ang |
| | Size, micrometers | 1–5 | 1–53 | 1–5 | 2–150 | 1–30 | 0.1–1 | 0.2–1 |
| | Refractive index | 1.6 | 1.5 | 1.6 | 1.8 | 1.5 | 2.5 | 2 |
| | Hardness Knoop | 820 | 500 | 820 | 2100 | — | 600 | 200 |
| | Weight % | 82.6 | 90.6 | 77 | 97.4 | 92.4 | 90.6 | 90.9 |
| | Volume % | 68.2 | 82.1 | 60 | 92.4 | 91.2 | 84.3 | 68.6 |
| | Binder:particle volume ratio | 0.47 | 0.22 | 0.66 | 0.08 | 0.10 | 0.36 | 0.47 |

TABLE II

| EXAMPLE NO. | | 1 | | 2 | | 3 | | 4 | | 5 | 6 | 7 | | 8 |
|---|---|---|---|---|---|---|---|---|---|---|---|---|---|---|
| Marking liquid | Composition | GTA | tol | DOP | $H_2O$ | DOP | $H_2O$ | DBP | $H_2O$ | DBP | DOP | DOP | FAT | DOP |
| | Refractive index | 1.5 | 1.5 | 1.5 | 1.3 | 1.5 | 1.3 | 1.5 | 1.3 | 1.5 | 1.5 | 1.5 | 1.3 | 1.5 |
| | Boiling point, °C. | 259 | 110 | 225+ | 100 | 225+ | 100 | 340 | 100 | 340 | 225+ | 225+ | 215 | 225+ |
| Duration of mark, hrs @ 20° C. | | 24 | 0.008 | >8000 | 0.2 | >10000 | 0.2 | 800 | 0.2 | 800 | >15000 | >16000 | 1.5 | >16000 |
| Coating reflectance, | Un-imaged | 59 | 53 | 53 | 40 | 40 | 69 | 69 | 70++ | 70++ | 91 | 70 | 58 | 58 |

TABLE II-continued

| | | | | | | | | |
|---|---|---|---|---|---|---|---|---|
| % Imaged | 18 | 6 7 | 15 10 | 13 6 | 32++ 20++ | 11 | 6 | 24 6 |
| Cohesion test, grams-force | 1000 | *** | *** | 550 | 550 | 450 | 200 | 700 |
| Image force test, grams-force | 1400 | >3000 | >3000 | 500 | 500 | 550 | 400 | 600 |
| EXAMPLE NO. | 9 | 10 | 11 | 12 | 13 | 14 | A* | B** |
| Marking liquid: Composition | DOP | DEP | DOP | PG | PASI | DIM | | |
| Marking liquid: Refractive index | 1.5 | 1.5 | 1.5 | 1.4 | 2.1 | 1.7 | | |
| Marking liquid: Boiling point, °C. | 225+ | 294 | 225+ | 189 | ~400 | 181 | | |
| Duration of mark, hours @ 20° C. | >17000 | 70 | >6000 | 0.5 | decomposes | 0.5 | | |
| Coating reflectance, %: Unimaged | 8 | 41 | 23 | 36 | 89 | 84 | | |
| Coating reflectance, %: Imaged | 5 | 5 | 9 | 8 | 40 | 53 | | |
| Cohesion imaged grams-force | 400 | 250 | *** | 350 | 900 | 900 | 150 | <50 |
| Image force test, grams-force | 600 | 800 | >3000 | 700 | 1000 | 1300 | 200 | 100 |

*Comparative example made according to U.S. Pat. No. 2,854,350 (138 parts 1% aqueous solution of sodium alginate, 10 parts precipitated $CaCO_3$)
**Comparative example made according to U.S. Pat. No. 3,508,344 (15 parts cellulose acetate, 5 parts DEP, 56 parts acetone, 27.5 parts toluene)
***Particles larger than 50 micrometers preclude performance of test
+At 4 mm Hg
++Measured using a zero reflectance black plate behind sample Many uses have heretofore been suggested for microvoid-containing coating, but no prior art product has performed with the remarkable degree of effectiveness as the product of the present invention. In addition, this product performs outstandingly in applications where prior art materials were completely ineffective. Repeatedly reusable products made in accordance with the invention are thus effective in the manufacture of student's workbooks, overhead transparencies, computer cards, cards for use as optical character recognition devices (for example, of the type shown in U.S. Pat. No. 3,639,732), stenographic pads, easel pads, etc. Another application contemplates a base sheet having a printed message which is normally obscured by a microvoid layer but becomes visible when the microvoid layer is rendered transparent; for example, such a product might be used on the face of a highway sign, where the presence of rain would render the legend "slippery road" visible to oncoming motorists. Relatively coarse particles could advantageously be used in such a sign because of low cost and rapid evaporation of the rain.

Another contemplated use is for "efficacy labels" on drugs, foods, or other products which have limited storage life. In this application, half of the microvoid-containing layer on the face of the label might be transparentized at the time the product bearing the label is sold, using a transparentizing liquid having a volatility corresponding to the effective life of the product. Permanently printed on the label might be instructions to discard the contents when the two halves of the label match color. Many variations of this type of label are feasible.

In still another contemplated application, high viscosity liquids may be employed for marking, thereby minimizing the effect of temperature on the marked microvoid-containing layer. High viscosity liquids also penetrate microvoids slowly, thereby increasing the time required for transparentization. One potential application for such high viscosity marking liquids is in fast food restaurants where food is discarded if more than, say, ten minutes elapses between preparation and serving. A wrapping paper on which appeared a label bearing a microvoid-containing coating, one half of which is permanently transparentized, might be treated with grease-resistant high viscosity silicone oil at the time a hamburger was wrapped. If a hamburger had not been served to a customer by the time the color of both halves of the label matched, the hamburger would be disposed of.

Numerous variations of the invention will readily occur to those skilled in the art. For example, a sign might be locally transparentized to provide an image or legend by "printing" with a clear lacquer, non-volatile fluorochemical, etc.. When the remainder of the sign was transparentized with a volatile liquid of matching refractive index, the legend would no longer be visible but would gradually reappear as the volatile liquid evaporates.

Similarly, sheet material in accordance with the invention lends itself to the temporary editing of printed or written material; if desired, a trace amount of dye could be included in the volatile marking liquid, so that a permanent visual record is maintained of the material previously temporarily expunged.

An unimaged sheet can also be locally transparentized by superposing a sheet coated with capsules containing a marking liquid and using an embossing gun. A completely transparentized sheet can also be locally opacified to display a desired legend by using a heated embossing gun to evaporate the marking liquid in selected areas without simultaneously compressing the microvoids.

What is claimed is as follows:

1. A self-supporting sheet material which is substantially insensitive to marking by the localized application of heat or pressure but which is receptive to ink, pencil, crayon or similar markings and which is adapted to being temporarily or permanently provided with markings by the application of a colorless liquid, comprising in combination:

a. a self-supporting base sheet and, b. bonded over at least one side of said base sheet, a reflective opaque white to pastel layer having an image force value of at least 500 grams-force and a cohesion value of at least 200 grams-force, said layer consisting essentially of particles which have a diameter in the range of 0.01 to 750 micrometers and a refractive index in the range of about 1.3 to 2.2, said particles being held in pseudo-sintered juxtaposition by a thermoset binder having a refractive index in the range of about 1.3 to 2.2 so that interconnected microvoids are present throughout said layer, the binder:particle volume ratio being in the range of about 1:20 to 2:3 and the void volume of said layer being in the range of 15–70%, whereby when liquid having a refractive index approximating that of the particles is applied to the exposed surface of said layer, said liquid penetrates the microvoids, thereby reducing the reflectivity of the layer in the vicinity of the liquid-penetrated microvoids to impart transparency.

2. The sheet material of claim 1 wherein the particles are siliceous and substantially free from internal voids.

3. The sheet material of claim 1 or 2 wherein the binder is a polyester resin.

4. The sheet material of claim 3 wherein the void volume of the layer is in the range of 35% to 50%.

5. In self-supporting sheet material of the type comprising a self-supporting base sheet on at least one surface of which is coated and opaque layer comprising particles having a refractive index in the range of about 1.4 to 1.6, said particles being incorporated in an organic binder, likewise having a refractive index in the range of about 1.4 to 1.6, interconnected microvoids being present throughout said layer, so that when liquid having a refractive index approximating that of the particles and binder is applied to the surface of the layer, the liquid penetrates the microvoids, thereby reducing the reflectivity of the layer in the immediate vicinity of such penetration to impart transparency and permit the colored base sheet to be seen, the improvement comprising (1) said layer's having a cohesion value of at least 200 grams-force and an image force value of at least 500 grams-force, said particles being 0.01 to 750 micrometers in size, whereby normal handling pressure does not collapse the microvoids so as to cause localized transparentization and (2) said binder's being a thermoset polymeric material, whereby the application of heat likewise does not collapse the microvoids so as to cause localized transparentization.

* * * * *